United States Patent [19]

Gallitzendörfer et al.

[11] Patent Number: 4,541,664

[45] Date of Patent: Sep. 17, 1985

[54] WATER CONDUIT FOR A LATERAL AREA OF A WINDSHIELD OF A MOTOR VEHICLE

[75] Inventors: Josef Gallitzendörfer, Sindelfingen; Hans Götz, Böblingen; Peter Pfeiffer; Johann Tomforde, both of Sindelfingen, all of Fed. Rep. of Germany

[73] Assignee: Daimler-Benz Aktiengesellschaft, Fed. Rep. of Germany

[21] Appl. No.: 186,733

[22] Filed: Sep. 12, 1980

[30] Foreign Application Priority Data

Sep. 12, 1979 [DE] Fed. Rep. of Germany ....... 2936828

[51] Int. Cl.4 .............................................. B60J 9/00
[52] U.S. Cl. ...................................... 296/213; 98/2.17
[58] Field of Search ....................... 296/154, 192, 213; 98/2.14, 2.17

[56] References Cited

U.S. PATENT DOCUMENTS 3,938,856  2/1976  Janssen .................................. 296/154
4,036,522  2/1977  De Rees ............................... 296/154
4,088,366  5/1978  Gallitzendorfer ................... 296/154
4,285,540  8/1981  Harada ................................. 296/192

Primary Examiner—George E. A. Halvosa
Assistant Examiner—John A. Carroll
Attorney, Agent, or Firm—Craig and Burns

[57] ABSTRACT

A water conduit for water accumulating in lateral areas of the windshield of a motor vehicle. The conduit includes a main water channel formed by a molding extending at a spacing in front of the windshield and by another residual water channel located farther towards an outside. The main water channel leads without substantial deflection in a transverse direction of the vehicle to a trough or interruption, with the channel extending in the roof approximately in parallel to a longitudinal axis of symmetry of the vehicle. The residual water channel lies within an envelope line of a contour of the motor vehicle and is continued above lateral door cutouts of the motor vehicle to a rear portion of the motor vehicle.

10 Claims, 3 Drawing Figures

WATER CONDUIT FOR A LATERAL AREA OF A WINDSHIELD OF A MOTOR VEHICLE

The present invention relates to a water conduit and, more particularly, to a conduit for water accumulating in a lateral area of a windshield of a motor vehicle, with the conduit including a main water channel formed by a molding extending at a distance in front of the windshield and by another residual water channel located farther toward the outside.

A water conduit of the aforementioned type is proposed in, for example, Auslegeschrift No. 1,630,375; however, a disadvantage of such proposed arrangement resides in the fact that water rising laterally of the windshield is not perfectly removed even in an area above the windshield and, also, the proposed water conduit generates troublesome wind noises when the motor vehicle is operating.

The aim underlying the present invention essentially resides in providing a water conduit of the aforementioned type which perfectly removes water rising laterally of the windshield and which avoids the generation of wind noises, without exerting a disturbing effect on the total stylistic impression of the motor vehicle due to the necessary components for the water conduit.

In accordance with advantageous features of the present invention, a main water channel is provided which leads, without substantial deflection, in a transverse direction of the vehicle to a trough or interruption extending in the roof approximately in parallel to a longitudinal axis of symmetry of the vehicle. A residual water channel lies within an envelope line of the vehicle contour and is continued above lateral door cutouts into a rear part of the motor vehicle.

In accordance with further advantageous features of the present invention, provision is made that a molding section, constituting the main water channel, has an airfoil-shaped cross section and terminates, at a lower end thereof, in a base section extending approximately in parallel to a bottom edge of the windshield of the motor vehicle.

Advantageously, the molding section forming the main water channel extends almost in parallel to the windshield.

Advantageously, in accordance with further features of the present invention, the molding section may be bent in a direction toward the windshield with a tangent of the molding section to a longitudinal vertical axis forming an angle of about 52° to 58°.

In accordance with further features of the present invention, the molding section may be attached to a pillar of the windshield with a tangent to an adjacent area of the windshield pillar forming an angle of about 20°-24° with respect to a longitudinal axis of the vehicle.

Accordingly, it is an object of the present invention to provide a water conduit for a lateral area of a windshield of a motor vehicle which avoids, by simple means, shortcomings and disadvantages encountered in the prior art.

Another object of the present invention resides in providing a water conduit for a lateral area of a windshield of a motor vehicle which ensures an adequate draining of the water from the area of the windshield without adversely affecting the overall stylistic features of the motor vehicle.

Yet another object of the present invention resides in providing a water conduit for a lateral area of a windshield of a motor vehicle which ensures a perfect removal of water rising laterally of the windshield.

A further object of the present invention resides in providing a water conduit for a lateral area of a windshield of a motor vehicle which is simple in construction and therefore relatively inexpensive to manufacture.

A still further object of the present invention resides in providing a water conduit for a lateral area of a windshield of a motor vehicle which minimizes if not avoids a generation of wind noises when the motor vehicle is in operation.

These and other objects, features, and advantages of the present invention will become more apparent from the following description when taken in connection with the accompanying drawing which shows, for the purposes of illustration only, one embodiment in accordance with the present invention, and wherein.

Figure 1:
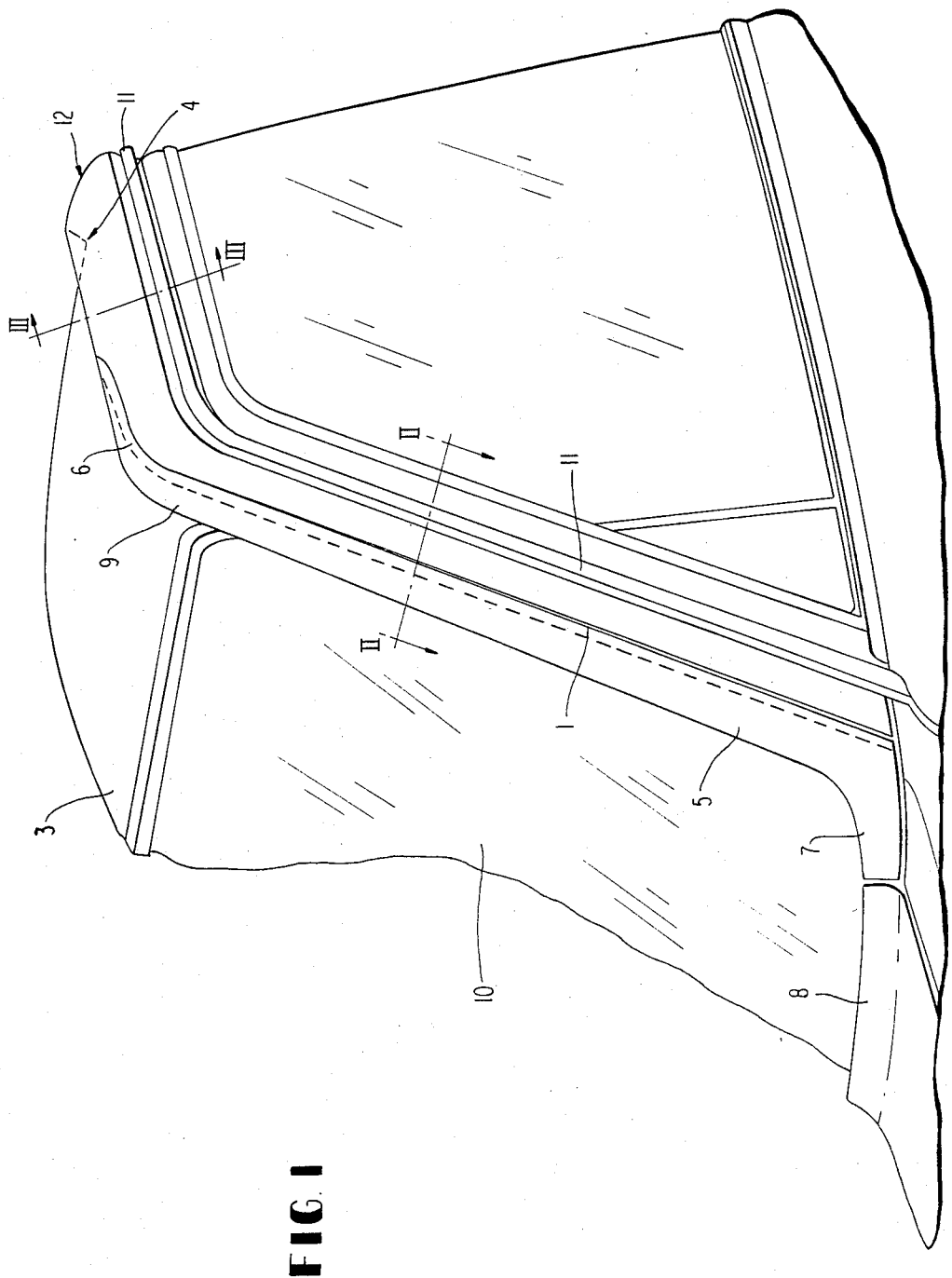
FIG. 1 is a partial elevational view of a water conduit in accordance with the present invention mounted on a motor vehicle.

Referring now to the drawings wherein like reference numerals are used throughout the various views to designate like parts and, more particularly, to FIG. 1, according to this Figure a molding 1 extends from a root of a windshield pillar 2 (FIG. 2) essentially in parallel to a windshield 10 up to a roof 3 of the motor vehicle to a corrugation or interruption generally designated by the reference numeral 4 located somewhat farther toward an inside of the roof 3. The molding 1 terminates at the roof 3 in a horizontal portion thereof forwardly of the interruption 4, with the interruption 4 extending farther toward a rear of the vehicle. The molding 1 forms a terminal 6 twisted toward a center of the vehicle. Due to the provision of the terminal 6 of the molding 1, dirt water is conducted in the area of the roof 3 in a direction toward the center of the vehicle and subsequently released.

Figure 2:
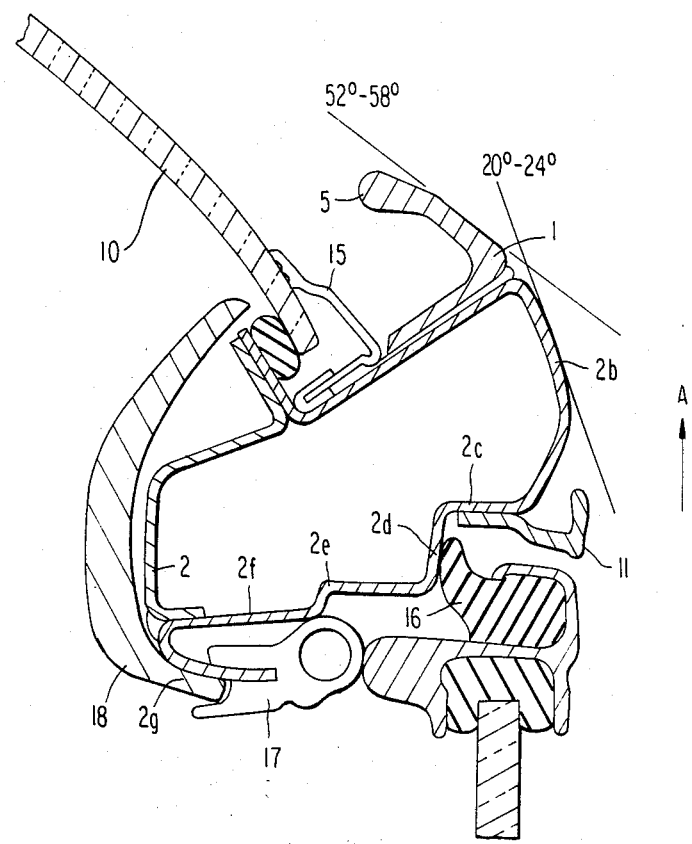
FIG. 2 is a cross sectional view taken along the line II—II of FIG. 1.

A base 7 is formed at a root of a molding 1, with the base 7 being a continuation of a collar like end of a hood 8. A section 5 of the molding 1 has, as shown in FIG. 2, an airfoil-shaped profile cross section and extends rotated toward a center of the vehicle. A guide channel for dirt water defined by the molding section 5 is illustrated in FIG. 1 by a phantom line 9.

A guiding strip 11 is provided on a lateral edge of the molding 1 or on the windshield pillar 2. The guiding strip 11 extends approximately from a base of the molding 1 almost in parallel to the windshield 10 up to a zone of the roof 3 and then laterally of the roof 3 in a rearward direction.

As shown in FIG. 1, which clearly depicts the courses of the main water conduit and residual watr conduit, the molding section 5 is drawn inwardly in an area of the roof 3 and passes over into the corrugation or interruption 4 which receives the dirt water collected by the molding section 5 and conducts this water along the roof 3. A residual water channel, in the form of the guide strip 11 serves to absorb water droplets from the outer surface of the windshield pillar and from the frame of the roof adjoining the windshield pillar 2. The guide strip 11 extends around a door aperture line or edge and is integrated into outer paneling generally designated by the reference numeral 12 of the motor vehicle.

The molding 1 causes the dirt water, which laterally rises from the windshield 10 to be guided along the channel 9 of the interruption 4 in a rearward direction whereby the side windows are kept extensively free of dirt. Any dirt water running off the outer paneling 12 is collected by the guide strip 11.

As shown in the cross sectional view of FIG. 2, a cover strip 15 laterally adjoins the windshield 10, with the cover strip 15 being attached to an area 2a of the windshield pillar 2. The molding 1 is mounted on the area 2a, with the molding 1 exhibiting the molding section bent in a direction toward the windshield 10. An area 2b of the windshield pillar 2 adjoining the area 2a, is configured such that a tangent of the area 2b maintains an angle of about 20° to 24° with respect to a driving direction of the motor vehicle designated by the arrow A.

The guide strip 11 adjoins the area 2b in such a manner that the guide strip 11 lies within an envelope line defined by the area 2b, that is, it does not project past the envelope line. The guide strip 11 has an approximately L-shaped configuration and, consequently, does not project out of the contour defined by the pillar paneling and the frame of the door of the motor vehicle.

As also shown in FIG. 2, the guide strip 11 is attached to an inwardly offset area 2c of the windshield pillar 2. The area 2c is followed by an area 2d which is approximately at a right angle to the area 2c. As shown in FIG. 2, an area 2e and area 2f with a bent portion 2g respectively follow the area 2d. The area 2d serves as a contact means for a seal 16 normally inserted in a door frame, merely schematically illustrated in the drawings, whereas, the area or portion 2g serves for accommodating a mounting element 17 for an inner cover 18.

The guide strip 11 is maintained at a predetermined distance with respect to the areas 2c so as to define a channel for the collection of rain drops. It is especially advantageous if a tangent laid on the molding section 5 which forms a leg of the molding 1, subtends an angle of about 52° to 58° with respect to the driving direction A of the motor vehicle; however, the specific angle would be dependent upon an outline or contour of the windshield.

Figure 3:
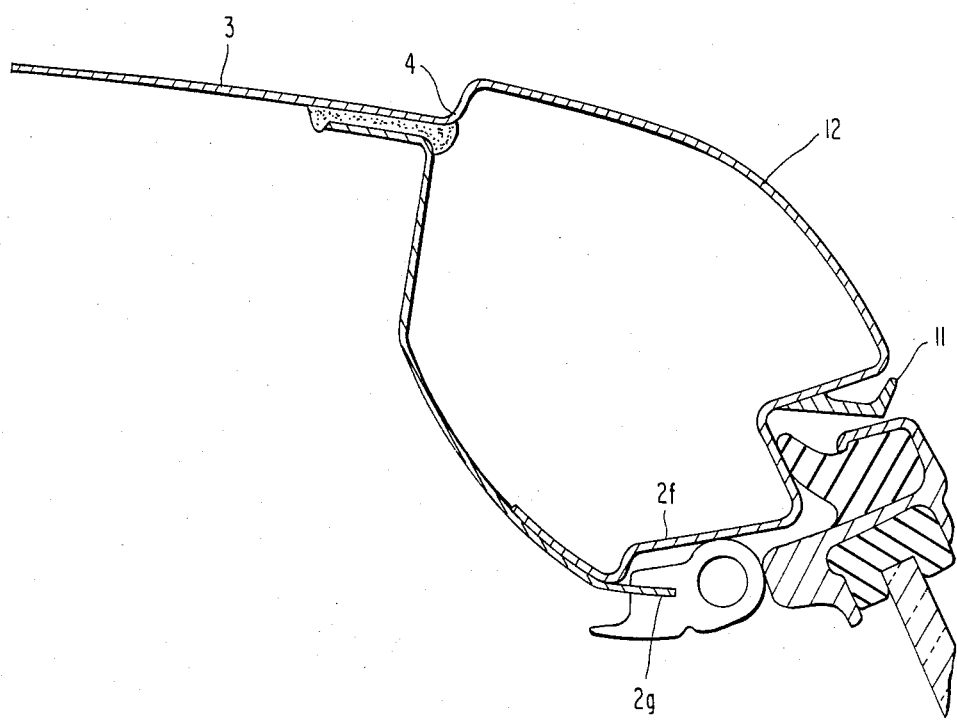
FIG. 3 is a cross sectional view taken along the line III—III of FIG. 1.

FIG. 3 provides a clear illustration of a transition between the roof 3 of the motor vehicle through the interruption or corrugation 4 and the outer paneling 12 to the guide strip 11.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A water conduit for water accumulating in lateral areas of a windshield of a motor vehicle, the conduit including a main water channel disposed at a distance from and forwardly of the windshield, and a residual water channel located farther toward an outside of the windshield, characterized in that a molding means is provided for defining the main water channel, the molding means extends approximately in parallel to a longitudinal center axis of the motor vehicle without substantial deflection in a transverse direction of the motor vehicle to a trough area provided at a roof of a motor vehicle, and in that the residual water channel lies within an envelope line of a contour of the motor vehicle and extends above lateral door cutouts of the motor vehicle to a rear portion of the motor vehicle.

2. A water conduit according to claim 1, characterized in that at least a section of the molding means has an airfoil-shaped cross sectional configuration, and in that the molding means terminates at a lower end thereof in a base portion which extends approximately in parallel to a lower edge of the windshield.

3. A water conduit according to claim 2, characterized in that the section of the molding means extends almost in parallel to lateral sides of the windshield.

4. A water conduit according to claim 3, characterized in that the section of the molding means is bent in a direction toward the windshield, and in that a line extending tangentially to the section of the molding means forms an angle of about 52° to 58° with respect to the longitudinal center axis of the motor vehicle.

5. A water conduit according to claim 4, characterized in that the molding means is adapted to be attached to a pillar of the windshield, and in that a line extending tangentially to an area adjacent the pillar of the windshield forms an angle of about 20° to 24° with the longitudinal center axis of the motor vehicle.

6. A water conduit according to claim 1, characterized in that at least a portion of the molding means extends almost in parallel to a lateral side of the windshield.

7. A water conduit according to claim 1, characterized in that at least a section of the molding means is bent in a direction toward the windshield, and in that a line extending tangentially to the section of the molding means forms an angle of about 52° to 58° with the longitudinal center axis of the motor vehicle.

8. A water conduit according to one of claims 1, 2, or 3, characterized in that the molding means is adapted to be attached to a pillar of the windshield, and in that a line extending tangentially to an area adjacent the pillar of the windshield forms an angle of about 20° to 24° with the longitudinal center axis of the motor vehicle.

9. A water conduit according to one of claims 1, 2, 3, 4, or 5, characterized in that guide strip means are provided for defining the residual water channel, and in that the guide strip means are adapted to be attached to an inwardly offset area of a pillar of the windshield of the motor vehicle.

10. A water conduit according to claim 9, characterized in that the guide strip means have an L-shaped cross sectional configuration.

* * * * *